United States Patent
Zha et al.

(10) Patent No.: US 11,453,782 B2
(45) Date of Patent: Sep. 27, 2022

(54) PIGMENT PARTICLE TEMPLATE AND METHOD OF FABRICATING SAME, AND METHOD OF FABRICATING PIGMENT DISPERSION LIQUID

(71) Applicant: TCL China Star Optoelectronics Technology Co., Ltd., Shenzhen (CN)

(72) Inventors: Bao Zha, Shenzhen (CN); Hsiaohsien Chen, Shenzhen (CN)

(73) Assignee: TCL China Star Optoelectronics Technology Co., Ltd., Guangdong (CN)

( * ) Notice: Subject to any disclaimer, the term of this patent is extended or adjusted under 35 U.S.C. 154(b) by 239 days.

(21) Appl. No.: 16/767,131

(22) PCT Filed: Apr. 21, 2020

(86) PCT No.: PCT/CN2020/085749
§ 371 (c)(1),
(2) Date: May 27, 2020

(87) PCT Pub. No.: WO2021/203464
PCT Pub. Date: Oct. 14, 2021

(65) Prior Publication Data
US 2022/0119642 A1    Apr. 21, 2022

(30) Foreign Application Priority Data

Apr. 8, 2020 (CN) .......................... 202010268729.2

(51) Int. Cl.
| | | |
|---|---|---|
| C08G 73/00 | (2006.01) |
| C09B 69/10 | (2006.01) |
| C09D 7/41 | (2018.01) |
| C09B 67/08 | (2006.01) |
| C09D 17/00 | (2006.01) |

(52) U.S. Cl.
CPC .......... C09B 69/10 (2013.01); C09B 67/0013 (2013.01); C09D 7/41 (2018.01); C09D 17/002 (2013.01); C09D 17/003 (2013.01)

(58) Field of Classification Search
CPC ....... C09B 69/10; C09B 67/0013; C09D 7/41; C09D 17/002; C09D 17/003; G03F 7/004; C08G 73/00
USPC ......................................................... 523/201
See application file for complete search history.

(56) References Cited

U.S. PATENT DOCUMENTS 8,529,997 B2 * 9/2013 Heuft .................. H01L 51/0005
427/256

FOREIGN PATENT DOCUMENTS

| CN | 105593312 | 5/2016 |
| CN | 105642133 | 6/2016 |
| CN | 107540801 | 1/2018 |
| CN | 107789992 | 3/2018 |
| CN | 110054741 | 7/2019 |
| EP | 3586956 | 1/2020 |
| WO | WO 2005/098232 | 10/2005 |
| WO | WO 2017/031062 | 2/2017 |
| WO | WO 2018/111432 | 6/2018 |

OTHER PUBLICATIONS

English Machine Translation of CN 110054741. (Year: 2019).*
Xiao et al. "Enabling Covalent Organic Framework Nanofilms for Molecular Separation: Perforated Polymer-Assisted Transfer", ACS Applied Materials & Interfaces, 11(47): 44783-44791, Published Online Nov. 5, 2019.

* cited by examiner

Primary Examiner — Hannah J Pak (57) ABSTRACT

A pigment particle template and a method of fabricating the same, and a method of fabricating a pigment dispersion liquid are described. The method of fabricating the pigment particle template has steps of: providing a substrate; forming a covalent organic framework layer on the substrate, wherein the covalent organic framework layer has porous network structure; forming a first porous organic layer on the covalent organic framework layer; and replacing the substrate with a second porous organic layer. The present application is beneficial to production of nanoparticles with controllable particle size and uniform size by utilizing a controllable size of the covalent organic framework structure and a stability of a sandwich structure.

18 Claims, 2 Drawing Sheets

PIGMENT PARTICLE TEMPLATE AND METHOD OF FABRICATING SAME, AND METHOD OF FABRICATING PIGMENT DISPERSION LIQUID

RELATED APPLICATIONS

This application is a National Phase of PCT Patent Application No. PCT/CN2020/085749 having International filing date of Apr. 21, 2020, which claims the benefit of priority of Chinese Patent Application No. 202010268729.2 filed on Apr. 8, 2020. The contents of the above applications are all incorporated by reference as if fully set forth herein in their entirety.

FIELD AND BACKGROUND OF THE INVENTION

The present disclosure relates to a field of pigments, and more particularly to a pigment particle template and a method of fabricating the same, and a method of fabricating a pigment dispersion liquid.

With development of liquid crystal display technology, requirements for high color gamut, high penetration, and high contrast are getting higher and higher, and a color film photoresist is directly related to the color gamut, transmittance, and contrast. There is also a growing need for pigments that play a leading role in color film photoresists. The high thermal stability of the pigment can meet the manufacturing process temperature of the liquid crystal display. A particle size and a particle size distribution of the pigment are used as key factors.

At present, a method of fabricating nanoparticles is obtained through a "top-down" method, that is, using physical methods to grind and disperse large particles into nano-sized particles. The particle size produced by this method cannot be uniformly dispersed, and it is difficult to obtain pigments of small size (<50 nm). Therefore, with the development of liquid crystal display technology and the development of display technology, especially the application and popularization of high-definition technology (such as 4K, 8K image quality), the color gamut, penetration, and contrast requirements of display devices are becoming higher.

As a result, it is necessary to provide a pigment particle template and a method of fabricating the same, and a method of fabricating a pigment dispersion liquid to solve problems existing in the conventional technologies.

SUMMARY OF THE INVENTION

From above, the present disclosure provides a pigment particle template and a method of fabricating the same, and a method of fabricating a pigment dispersion liquid, which is beneficial to production of nanoparticles with controllable particle size and uniform size.

A main object of the present disclosure is to provide a pigment particle template and a method of fabricating the same, and a method of fabricating a pigment dispersion liquid, which uses a sandwich structure of a covalent organic framework (COF) to produce pigment particles. By using the size controllability of the COF structure and the stability of the sandwich structure, it is beneficial to production of nanoparticles with controllable particle size and uniform size.

In an embodiment of the present disclosure, the covalent organic framework layer is formed on the substrate by reacting an aldehyde-based material and an amine-based material, both of which are dissolved in a solvent.

In an embodiment of the present disclosure, the aldehyde-based material comprises: at least one of 2,4,6-trihydroxy-1,3,5-benzenetrialdehyde, CHO, and -continued wherein n is between 1 and 20.

In an embodiment of the present disclosure, the first porous organic layer consists of a plurality of nano-microspheres, wherein material of the plurality of nano-microspheres comprises at least one of polystyrene (PS), polylactic acid-glycolic acid copolymer (PLGA), polymethacrylate ester (PMMA), and polyethersulfone resin (PES).

In an embodiment of the present disclosure, material of the second porous organic layer includes polyvinyl fluoride (PVDF).

In an embodiment of the present disclosure, the step of replacing the substrate with the second porous organic layer comprises: removing the substrate; and performing a transfer step to transfer the covalent organic framework layer and the first porous organic layer to the second porous organic layer, wherein the covalent organic framework layer is located between the first porous organic layer and the second porous organic layer.

In an embodiment of the present disclosure, the solvent comprises 1,3,5-trimethylbenzene.

Furthermore, another embodiment of the present disclosure provides a pigment particle template fabricated using of fabricating the pigment particle template according to any of the embodiments described above.

Furthermore, another embodiment of the present disclosure provides a method of fabricating a pigment dispersion liquid, comprising steps of: providing a pigment particle template, wherein the pigment particle template is fabricated using the method of fabricating the pigment particle template according to any of the embodiments described above; standing the pigment particle template in a pigment solution, wherein pigment molecules of the pigment solution crystallize are crystallized in a solution form inside the porous network structure of the pigment particle template to form pigment particles; and separating the pigment particles from the porous network structure by salt washing, and adding a surfactant to the pigment particles to obtain the pigment dispersion liquid.

Compared with the prior art, a pigment particle template and a method of fabricating the same, and a method of fabricating a pigment dispersion liquid of the present disclosure use a covalent organic framework (COF) with a sandwich structure to fabricate pigment particles. By using the size controllability of the COF structure and the stability of the sandwich structure, it is beneficial to production of nanoparticles with controllable particle size and uniform size.

In order to make the above contents of the present disclosure more obvious and understandable, the preferred

In an embodiment of the present disclosure, the amine-based material comprises at least one of P-phenylenediamine, embodiments are described in detail below, and in conjunction with the attached drawings, detailed description is as follows:

DETAILED DESCRIPTION OF SPECIFIC EMBODIMENTS OF THE INVENTION

Following descriptions of the embodiments refer to the attached drawings to illustrate specific embodiments of the present disclosure that can be implemented. Furthermore, directional terms mentioned in the present disclosure, such as upper, lower, top, bottom, front, rear, left, right, inner, outer, side, surrounding, central, horizontal, horizontal, vertical, longitudinal, axial, radial, an uppermost layer or a lowermost layer, etc., only refer to a direction of the accompanying figures. Therefore, the used directional terms are used to describe and understand the present disclosure, but the present disclosure is not limited thereto.

Figure 1:
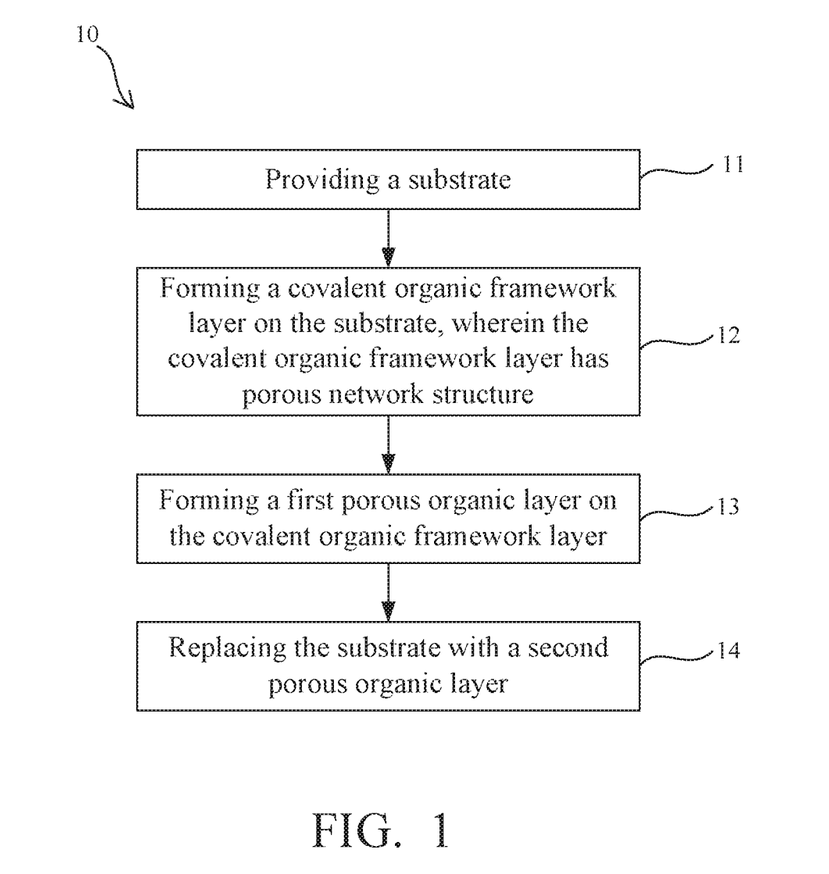
FIG. 1 is a flowchart of a method of fabricating a pigment particle template according to an embodiment of the present disclosure.

Referring to FIG. 1, FIG. 1 is a flowchart of a method 10 of fabricating a pigment particle template according to an embodiment of the present disclosure. A method 10 of fabricating a pigment particle template according to an embodiment of the present disclosure includes steps 11 to 14 of: providing a substrate (step 11); forming a covalent organic framework layer on the substrate, wherein the covalent organic framework layer has porous network structure (step 12); forming a first porous organic layer on the covalent organic framework layer (step 13); and replacing the substrate with a second porous organic layer (step 14).

The method 10 of fabricating the pigment particle template according to an embodiment of the present disclosure has a step 11 of: providing a substrate. In the step 11, the substrate is such as a silicon substrate.

The method 10 of fabricating the pigment particle template according to an embodiment of the present disclosure has a step 12 of: forming a covalent organic framework layer on the substrate, wherein the covalent organic framework layer has porous network structure. In the present step 12, a thickness of the covalent organic framework layer is, for example, 10 to 50 nm. In an embodiment, the covalent organic framework layer can be formed on the substrate by reacting an aldehyde-based material and an amine-based material, both of which are dissolved in a solvent. In an example, the aldehyde-based material comprises: at least one of 2,4,6-trihydroxy-1,3,5-benzenetrialdehyde, -continued and

-continued

In another example, the amine-based material comprises at least one of P-phenylenediamine, -continued wherein n is between 1 and 20. In another example. In another example, the solvent comprises 1,3,5-trimethylbenzene.

It is noted that through a combination of aldehyde-based materials and amine-based materials, a pore size of the porous network structure of the covalent organic framework layer can be adjusted, so that the pigment can be formed into nanoparticles of corresponding sizes. For example, the pore size of the porous network structure is between 10 and 50 nanometers. In an embodiment, the covalent organic framework layer is prepared by dissolving 2,4,6-trihydroxy-1,3,5-benzenetrialdehyde and p-phenylenediamine at a molar ratio of 1:1 into 1,3,5-trimethylbenzene solvent and reacting at 120° C. for 30 minutes. A structural formula of the covalent organic framework layer formed after the reaction is shown in the following formula (1):

formula (1)

The above formula (1) only shows a part of the covalent organic framework layer. In fact, the covalent organic framework layer has a plurality of holes surrounded by aldehyde-based materials and amine-based materials. In one embodiment, by using a specific amine-based material, a size of the holes and/or the thickness of the covalent organic framework layer can also be adjusted. In an example, for example, the amine-based material is wherein the size of the holes can be changed by adjusting a value of n (for example, between 1 and 20), and then the size of the nanoparticles can be adjusted. In an embodiment, the larger the value of n, the larger the hole; the smaller the value of n, the smaller the hole. In another embodiment, the larger the value of n, the greater the thickness of the covalent organic framework layer; the smaller the value of n, the smaller the thickness of the covalent organic framework layer.

The method 10 of fabricating the pigment particle template according to an embodiment of the present disclosure has a step 13 of: forming a first porous organic layer on the covalent organic framework layer. In the present step 13, the first porous organic layer consists of a plurality of nano-microspheres, wherein material of the plurality of nano-microspheres comprises at least one of polystyrene (PS), polylactic acid-glycolic acid copolymer (PLGA), polymethacrylate ester (PMMA), and polyethersulfone resin (PES). In an embodiment, a particle diameter of the nano-microspheres cam be between 100 nm and 1000 nm, a thickness of the first porous organic layer can be between 1 um and 5 um, and an average pore size of the first porous organic layer can be between 200 and 800 nm.

The method 10 of fabricating the pigment particle template according to an embodiment of the present disclosure has a step 14 of: replacing the substrate with a second porous organic layer. In the present step 14, material of the second porous organic layer includes, for example, polyvinyl fluoride (PVDF). In an embodiment, the step of replacing the substrate with the second porous organic layer comprises: removing the substrate; and performing a transfer step to transfer the covalent organic framework layer and the first porous organic layer to the second porous organic layer, wherein the covalent organic framework layer is located between the first porous organic layer and the second porous organic layer. In an embodiment, a thickness of the second porous organic layer can be between 3 and 5 um, and a average pore size can be between 200 and 800 nm.

In summary, the pigment particle template fabricated according to an embodiment of the present disclosure has a sandwich structure, wherein the covalent organic framework layer is located between the first porous organic layer and the second porous organic layer. The covalent organic framework layer is mainly used as a pigment template, which enables pigment molecules to form nanoparticles in the porous network structure of the covalent organic framework layer. In addition, by sandwiching the covalent organic framework layer between the first porous organic layer and the second porous organic layer to stabilize an overall structure of the pigment particle template, it is beneficial to production of nanoparticles with controllable particle size and uniform size.

In one embodiment, the pigment particle template of the present disclosure can be fabricated by the method of fabricating the pigment particle template of any of the above embodiments.

Figure 2:
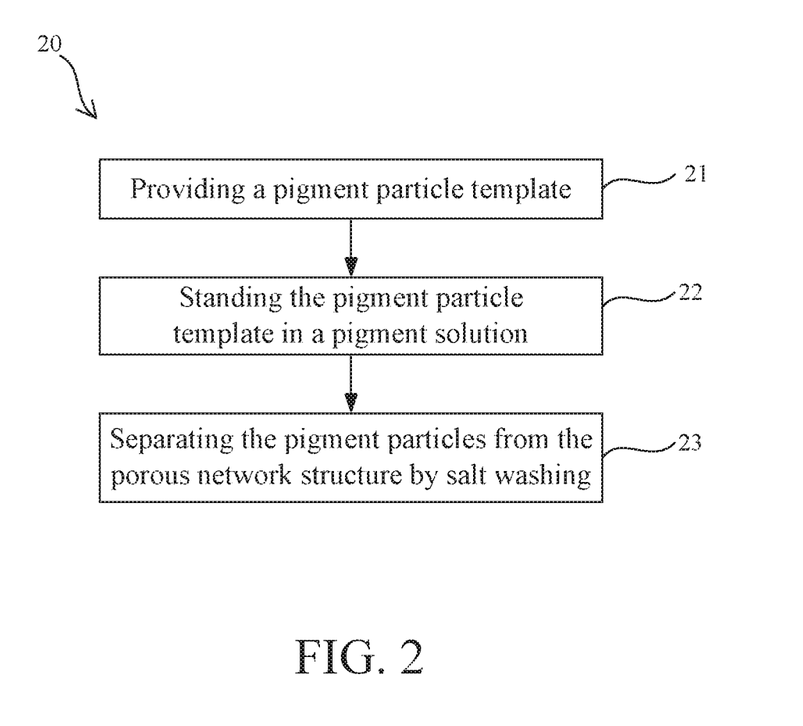
FIG. 2 is a flowchart of a method of fabricating a pigment dispersion liquid according to an embodiment of the disclosure.

Refer to FIG. 2, which is a flowchart of a method 20 of fabricating a pigment dispersion liquid according to an embodiment of the disclosure. An embodiment of the present disclosure provides a method 20 of fabricating a pigment dispersion liquid, comprising steps 21 to 23 of: providing a pigment particle template, wherein the pigment particle template is fabricated using the method of fabricating the pigment particle template according to any of the embodiments described above (step 21); standing the pigment particle template in a pigment solution, wherein pigment molecules of the pigment solution crystallize are crystallized in a solution form inside the porous network structure of the pigment particle template to form pigment particles (step 22); and separating the pigment particles from the porous network structure by salt washing, and adding a surfactant to the pigment particles to obtain the pigment dispersion liquid (step 23).

In the following, several examples will be given to specifically describe the fabricating method of the examples of the present disclosure.

Embodiment 1

First, a substrate (for example, a silicon substrate) is provided. A covalent organic framework layer is formed on the substrate, wherein the covalent organic framework layer is prepared by dissolving 2,4,6-trihydroxy-1,3,5-benzenetrialdehyde and p-phenylenediamine at a molar ratio of 1:1 into 1,3,5-trimethylbenzene solvent and reacting at about 120° C. for about 30 minutes. A structural formula of material of the covalent organic framework layer is shown in the above formula (1).

After the formation of the covalent organic framework layer, coating the first porous organic layer on the covalent organic framework layer can strengthen and protect the stability of the covalent organic framework layer, wherein the first porous organic layer consists of a plurality of nano-microspheres, wherein material of the plurality of nano-microspheres comprises at least one of polystyrene (PS), polylactic acid-glycolic acid copolymer (PLGA), polymethacrylate ester (PMMA), and polyethersulfone resin (PES).

After the first porous organic layer is formed, the substrate is etched away using an acid solution (e.g., hydrofluoric acid, 3 wt %). Then, a transfer step is performed to transfer the covalent organic framework layer and the first porous organic layer onto the second porous organic layer, wherein the covalent organic framework layer is located between the first porous organic layer and the second porous organic layer. In this embodiment, material of the second porous organic layer includes polyvinyl fluoride (PVDF). A thickness of the second porous organic layer is between 3 and 5 um, and an average pore size is between 200 and 800 nm.

Through the above steps, a pigment particle template with a sandwich structure can be obtained. The covalent organic framework layer of the pigment particle template has size controllability and stability by forming a sandwich structure, which is beneficial to production of nanoparticles with controllable particle size and uniform size.

Embodiment 2

First, the pigment particle template fabricated by the method of the present disclosure is provided. After that, the pigment particle template is allowed to stand in a pigment solution, so that the pigment molecules of the pigment solution are crystallized in the porous network structure of the pigment particle template in the form of a solution to form pigment particles. Thereafter, the pigment particles are separated from the porous network structure by a salt washing method (for example, a salt washing agent is sodium chloride).

The above-mentioned pigment particle template is used to produce highly dispersed pigments with uniform particle size (for example, between 10 and 30 nm) and controllable dimensions. High-dispersion pigments can be used as pigments for color photoresists, with excellent properties such as high contrast and high penetration. Further, high-dispersion pigments can meet the development needs of liquid crystal displays with high color gamut, high penetration and high contrast. The high-dispersion pigments may be, for example, at least one of pigment red 177, pigment red 207, pigment red 244, pigment red 254, pigment red 291, pigment red 296, pigment green 7, pigment green 36, pigment green 58, pigment green 59, pigment green 62, pigment green 63, pigment yellow 114, pigment yellow 126, pigment yellow 138, pigment yellow 139, pigment yellow 150, pigment yellow 185, pigment blue 15:1, pigment blue 15:2, pigment blue 15:3, pigment blue 15:4, pigment blue 15:5, pigment blue 15:6, and pigment violet 23.

The above provides a detailed description of a pigment particle template and a method of fabricating the same, and a method of fabricating a pigment liquid. In this article, specific examples are used to explain the principle and implementation of the present application. The descriptions of the above embodiments are only used to help understand the technical solutions and core ideas of the present application. Those of ordinary skill in the art should understand that they can still modify the technical solutions described in the foregoing embodiments, or equivalently replace some of the technical features. However, these modifications or substitutions do not deviate the essence of the corresponding technical solutions from the scope of the technical solutions of the embodiments of the present application.

The invention claimed is:

1. A method of fabricating a pigment particle template, comprising steps of:
    providing a substrate;
    forming a covalent organic framework layer on the substrate, wherein the covalent organic framework layer has porous network structure;
    forming a first porous organic layer on the covalent organic framework layer; and
    replacing the substrate with a second porous organic layer,
    wherein the first porous organic layer consists of a plurality of nano-microspheres, wherein material of the plurality of nano-microspheres comprises at least one of polystyrene (PS), polylactic acid-glycolic acid copolymer (PLGA), polymethacrylate ester (PMMA), and polyethersulfone resin (PES).

2. The method of fabricating the pigment particle template according to claim 1, wherein the covalent organic framework layer is formed on the substrate by reacting an aldehyde-based material and an amine-based material, both of which are dissolved in a solvent.

3. The method of fabricating the pigment particle template according to claim 2, wherein the aldehyde-based material comprises: at least one of 2,4,6-trihydroxy-1,3,5-benzenetrialdehyde, 4. The method of fabricating the pigment particle template according to claim 2, wherein the amine-based material comprises at least one of P-phenylenediamine wherein n is between 1 and 20.

5. The method of fabricating the pigment particle template according to claim 1, wherein material of the second porous organic layer includes polyvinyl fluoride (PVDF).

6. The method of fabricating the pigment particle template according to claim 1, wherein the step of replacing the substrate with the second porous organic layer comprises:
  removing the substrate; and
  performing a transfer step to transfer the covalent organic framework layer and the first porous organic layer to the second porous organic layer, wherein the covalent organic framework layer is located between the first porous organic layer and the second porous organic layer.

7. The method of fabricating the pigment particle template according to claim 2, wherein the solvent comprises 1,3,5-trimethylbenzene.

8. A pigment particle template fabricated from the method of fabricating the pigment particle template according to claim 1.

9. The pigment particle template according to claim 8, wherein the covalent organic framework layer is formed on the substrate by reacting an aldehyde-based material and an amine-based material, both of which are dissolved in a solvent.

10. The pigment particle template according to claim 9, wherein the aldehyde-based material comprises: at least one of 2,4,6-trihydroxy-1,3,5-benzenetrialdehyde,

-continued

11. The pigment particle template according to claim 9, wherein the amine-based material comprises at least one of

P-phenylenediamine

-continued wherein n is between 1 and 20.

12. A method of fabricating a pigment dispersion liquid, comprising steps of:
    providing a pigment particle template, wherein the pigment particle template is fabricated from the method of fabricating the pigment particle template according to claim 1;
    standing the pigment particle template in a pigment solution, wherein pigment molecules of the pigment solution crystallize are crystallized in a solution form inside the porous network structure of the pigment particle template to form pigment particles; and
    separating the pigment particles from the porous network structure by salt washing.

13. The method of fabricating the pigment dispersion liquid according to claim 12, wherein the covalent organic framework layer is formed on the substrate by reacting an aldehyde-based material and an amine-based material, both of which are dissolved in a solvent.

14. The method of fabricating the pigment dispersion liquid according to claim 13, wherein the aldehyde-based material comprises: at least one of 2,4,6-trihydroxy-1,3,5-benzenetrialdehyde,

15. The method of fabricating the pigment dispersion liquid according to claim 13, wherein the amine-based material comprises at least one of P-phenylenediamine, wherein n is between 1 and 20.

16. The method of fabricating the pigment dispersion liquid according to claim 12, wherein material of the second porous organic layer includes polyvinyl fluoride (PVDF).

17. The method of fabricating the pigment dispersion liquid according to claim 12, wherein the step of replacing the substrate with the second porous organic layer comprises:

removing the substrate; and performing a transfer step to transfer the covalent organic framework layer and the first porous organic layer to the second porous organic layer, wherein the covalent organic framework layer is located between the first porous organic layer and the second porous organic layer.

18. The method of fabricating the pigment dispersion liquid according to claim 13, wherein the solvent comprises 1,3,5-trimethylbenzene.

* * * * *

UNITED STATES PATENT AND TRADEMARK OFFICE
CERTIFICATE OF CORRECTION

PATENT NO. : 11,453,782 B2
APPLICATION NO. : 16/767131
DATED : September 27, 2022
INVENTOR(S) : Zha et al.

It is certified that error appears in the above-identified patent and that said Letters Patent is hereby corrected as shown below:

On the Title Page

Item (73) Assignee:
"TCL China Star Optoelectronies Technology Co., Ltd."
Should be changed to:
-- TCL China Star Optoelectronics Technology Co., Ltd. --

Signed and Sealed this
Twenty-eighth Day of February, 2023

Katherine Kelly Vidal
*Director of the United States Patent and Trademark Office*